(12) United States Patent
Koba et al.

(10) Patent No.: US 6,269,174 B1
(45) Date of Patent: Jul. 31, 2001

(54) APPARATUS AND METHOD FOR FAST MOTION ESTIMATION

(75) Inventors: Igor M. Koba; Mikhail B. Charnomordik, both of Savannah, GA (US)

(73) Assignee: Ligos Corporation, San Francisco, CA (US)

( * ) Notice: Subject to any disclaimer, the term of this patent is extended or adjusted under 35 U.S.C. 154(b) by 0 days.

(21) Appl. No.: 09/054,784

(22) Filed: Apr. 3, 1998

Related U.S. Application Data

(60) Provisional application No. 60/063,536, filed on Oct. 28, 1997.

(51) Int. Cl.[7] ........................................... G06K 9/00
(52) U.S. Cl. ..................... 382/107; 382/236; 348/154; 348/155
(58) Field of Search ............................ 382/107, 232, 382/236, 239, 420, 421, 171, 422; 348/669; 375/240.2

(56) References Cited

U.S. PATENT DOCUMENTS

| | | | |
|---|---|---|---|
| 4,383,272 | 5/1983 | Netravali et al. | 358/136 |
| 4,439,759 | 3/1984 | Fleming et al. | 340/703 |
| 4,958,226 | 9/1990 | Haskell et al. | 358/136 |
| 5,227,878 | 7/1993 | Puri et al. | 358/136 |
| 5,659,365 | * 8/1997 | Wilkinson | 348/416 |
| 5,680,483 | * 10/1997 | Tranchard | 382/239 |
| 5,774,593 | * 6/1998 | Zick et al. | 382/236 |
| 5,911,008 | * 6/1999 | Niikura et al. | 382/236 |
| 5,946,405 | * 8/1999 | Kim et al. | 382/107 |
| 5,949,905 | * 8/1999 | Nichani et al. | 382/103 |
| 6,049,362 | * 4/2000 | Butter et al. | 348/699 |
| 6,101,276 | * 8/2000 | Adiletta et al. | 382/236 |
| 6,118,823 | * 9/2000 | Carr | 375/240.28 |

* cited by examiner

Primary Examiner—Joseph Mancuso
Assistant Examiner—A. Tabatabai
(74) Attorney, Agent, or Firm—Thomas, Kayden, Horstemeyer & Risley

(57) ABSTRACT

A method is provided for motion estimation for a set of pixel blocks (macroblocks) in a current video frame in reference to a previous video frame. In accordance with one aspect of the invention, the method includes calculates a set of characteristic values for each macroblock position in the previous video frame. Preferably, the method stores these values in memory in a fashion whereby they may be easily retrieved at a later time. For example, the values may be indexably stored in a table format. The method further calculates N levels of group characteristic values for a plurality of groups, wherein each group includes multiple macroblocks. The method then estimates motion for each reference macroblock from the current video frame, by testing highest level group characteristic values calculated in the step that calculates the N levels of group characteristics. Then, the method tests the next group characteristic values, if it has not already tested the lowest group. The method will continue testing subsequent groups until it ultimately tests the individual macroblock characteristics at the lowest group characteristic level.

27 Claims, 4 Drawing Sheets

APPARATUS AND METHOD FOR FAST MOTION ESTIMATION

CROSS-REFERENCE TO RELATED APPLICATIONS

This application claims the benefit of U.S. Provisional Application entitled FAST MOTION ESTIMATION METHOD AND APPARATUS BASED ON MULTILEVEL CHARACTERISTIC TABLES, filed Oct. 28, 1997, and assigned Ser. No. 60/063,536.

BACKGROUND OF THE INVENTION

Motion estimation is an essential part of modern digital video encoding systems. Such standards as ISO MPEG-1 (formally known as ISO/IEC 11172), ISO MPEG-2 (formally known as ISO/IEC 13818), ITU-T H.261, ITU-T H.263, ISO MPEG-4 and many other video coding technologies utilize motion compensation as a mean for reducing data redundancy by transmitting components of motion vector (MV) for a set of rectangular pixel blocks (macroblocks in MPEG-1 and MPEG-2 terminology).

The process of searching the best suitable motion vectors for all macroblocks is called motion estimation (ME). It is generally known to be the most computationally complex element of video encoding systems. It is often the most expensive and power-consuming part of digital video encoding systems and the most processor intensive part of software video encoding and video conferencing applications. Similar procedure to ME is used in some other applications that involve searching for data correlation in images or 2-dimensional arrays, for example: image recognition, robotic vision, still image data compression and so on.

When the motion estimation procedure is completed, the digital video encoder stores the motion vector components for every pixel block of the video frame in the output data stream so that the video decoder will be able to apply motion compensation when reconstructing the video frame sequence.

The ME algorithm of is not a normative part of video encoding standard specifications, so the developer has some freedom in choosing a ME method. The purpose is to find a particular macroblock on the current video frame that is most similar to the macroblock on the previous video frame. As is known, a macroblock which is often used to refer to the pel data, contains the luminance data a chroma format. For example, a macroblock may comprise the four 8 by 8 blocks of luminance data and the two (for 4:2:0 chroma format), four (for 4:2:2 chroma format) or eight (for 4:4:4 chroma format) corresponding 8 by 8 blocks of chrominance data coming from a 16 by 16 section of the luminance component of the picture.

Often the search area is limited by some fixed maximum value of motion vector components. In many video encoding methods (for example MPEG-1 and MPEG-2), from a set of equally good macroblocks and motion vectors, which represent said macroblock's position, the one with the minimum length motion vector is preferable because it requires fewer bits to encode the motion vector components. A motion vector search requires a criterion specifying the best outcome. Usually mean squared error (MSE) or mean absolute distortion (MAD) is used as a block matching criterion. Some other criteria for block matching have been proposed. For the subject of the present invention the choice of block matching criterion is not significant.

Full or exhaustive spiral search (calculating matching criteria for every mackroblock of the current frame carried out in a spiral order within a limited search area on the previous frame) is usually assumed to give the best possible quality of ME. Unfortunately, full spiral search algorithms require a large number of calculations and are not suitable for many applications. For example, full spiral search ME for a picture size of 360×240 pixels within search area of +/−64 pixels and with a macroblock size of 16×16 pixels requires on the order of $10^{10}$ integer arithmetic operations.

Many different approaches have been proposed to reduce the computational cost of ME. The proposed "fast ME" algorithms can be categorized into several groups, described below. All of them are based on assumptions about a particular type of continuity in the dependency of matching criterion from motion vector components, or some temporal or spatial correlation between the best possible motion vector values. Such assumptions do not always hold, as we will describe later. Such assumptions underly all known fast ME methods and limit their usefulness.

Fast ME with Unimodal Error Surface Assumption

Many kinds of fast ME algorithms restrict the number of tested MV by assuming that matching error increases monotonically when the point of the ME search moves away from the best possible ME position. However, this assumption does not usually hold for real input video signals. A real input video signal always contains some level of noise in its pixel values and often contains an unpredictable amount of small and large visible objects in the frame. As a result the search is often trapped to a local minimum position far from the global minimum of a targeting matching criterion.

One example of such an algorithm is the two-dimensional logarithmic search that described by T.Koga, K.Iinuma, A.Hirano etc. in "Motion compensated interframe coding for video conferencing", Proc.Nat.Telecommunication Conf., pp. G5.3.1–5.3.5, Nov, 29–Dec. 3 1981. Another example of a method that is related to unimodal error surface assumption described in U.S. Pat. No. 5,623,313 to Naveen, entitled "Fractional pixel motion estimation of video signal".

Fast ME with Pixel Subsampling

One class of fast ME algorithms, sometimes referred to as Fast ME with Pixel Subsampling, is based on limiting the number of pixels used in the calculation of matching criterion. It is based on the assumption that if the error in some subset of pixels in the macroblock is minimized, the targeting matching criterion is minimized as well. This assumption usually does not hold for real input video signals. In addition, this algorithm provides for a relatively small reduction in the number of required calculations, usually from 4 to 16 times, and further reduction is desired.

Hierarchical and Multiresolution Methods of Fast ME

Another group of fast ME methods is based on doing a preliminary search of motion vectors on a coarse-resolution frame and refining the predicted motion vector in the frame with fine resolution. This is known as a hierarchical method and uses several levels of search with the same image size, but different block sizes at every level, as proposed in M.Bierling, "Displacement estimation by hierarchical block matching", Proc. SPIE Visual Communications and Image Processing 1988, vol. 1001, pp 942–951. This approach is based on the assumption that the motion vector obtained for the large block size is a good starting point for the search for smaller block sizes. However, this assumption is not always true and may not give a good initial motion vector.

A multiresolution method (also known as a pyramidal method) uses several coarse levels of image created from original image by reducing image resolution. In this approach, the search is performed first on the coarsest-resolution image for the proportionally reduced size of macroblock. Then, the best resulting motion vector is interpolated to obtain an initial value of motion vector for the next level. The motion vector is then refined, by searching in a small area on the next level.

A variation of this method was described in K.M.Uz, M.Verittiand D.LeGall, "Interpolative multiresolution coding of advanced television with comparable subchannels", IEEE Trans. Circuits Syst. Video Technol., vol.1, pp.86–99, March 1991., and in S.Zafar, Y.Q.Zhang, B.Jabbari, "Multiscale video representation using multiresolution motion compensation and wavelet decomposition", IEEE J.Select.Areas Commun., vol.11, pp.24–35, January 1993. Another example of hierarchical ME is described in U.S. Pat. No. 5,635,994 to Drexler et al, entitled "Method of making a hierarchical estimate of image motion in a television signal." This class of ME methods is based on the assumption that the best motion vector for a given coarse resolution image level and proportionally reduced size of macroblock is a good estimation for the next finer level. This may work for smooth, relatively monotonous images, but not for images with fine details that are invisible at coarse resolutions. This approach is also less effective for input with significant levels of noise in the signal.

Fast ME Based on Assumption of Spatial or Temporal Correlation of MV

Another class of fast ME methods, known as Fast ME based on assumption of spatial or temporal correlation of MV is based on the assumption of a correlation between values of optimum motion vectors for spatially neighboring macroblocks on the same frame, or temporally neighboring macroblocks for the same location on the sequential frames. One widely known example of this method is a telescopic search, which assumes that the motion vector for a particular macroblock can be a good initial approximation for the motion vector search on sequential frames.

Another algorithm based on assumption of spatial or temporal correlation, was described by S.Zafar, Y.-Q.Zhang, J.S.Baras, "Predictive block-matching motion estimation for TV coding", IEEE Trans.Broadcast., vol. 37, pp. 97–105, September 1991. A hybrid approach using spatial/temporal correlation and multiresolution, was described by J. Chalidabhongse. C.-C.Kuo, in "Fast motion vector estimation using multiresolution-spatio-temporal correlations", IEEE Trans. On Circ. and Syst. for video technology, vol.7, No3, June 1997.

The assumption of spatial or temporal correlation between values of optimum motion vector for spatially neighboring macroblocks may not hold for real input video signals. Although it may be valid for estimating the motion of large objects without noise in the video signal, it will often not work well on video containing many small moving objects and high level of noise.

Fast MA Based on Reducing Data set for Block Matching

Another class of fast ME methods, referred to as Fast ME based on reducing data set for block matching replaces initial video frame data with a reduced data set before performing ME. An example of this method is described in Xiaobing Lee, Ya-Qin Zhang, "A fast hierarchical motion-compensation scheme for video coding using block feature matching", IEEE Trans. On Circ. and Syst. for video technology, vol.6, No. 6, December 1996. This approach proposes replacing the initial image data by a sign truncated feature (STF) representation consisting of a mean values vector and sign-truncated vector, which represent every pixel by one bit. The value of this bit depends on the difference in sign between actual pixel data value and mean value. The ME search is then implemented on the STF data set.

Another example of this method was described in U.S. Pat. No. 5,612,746 to Slavin, entitled "Block matching for picture motion estimation using offset quantized pixels." This patent proposed replacing initial image data by quantized pixel values and measuring macroblock correlation by comparing the quantized pixel values between macroblocks. This essentially introduces new block matching criteria, not new ME methods. Although these new matching criteria can be calculated faster, there is no reason to expect better resultant values than those calculated using standard mean square error (MSE) or mean absolute distortion (MAD) criteria.

Selecting Macroblock by Means of a Set of Characteristics

A method based on calculating a set of characteristics for every pixel block, was described by D. R. McGregor, R. J. Fryer, P. Cockshot, P Murray,"Faster Fractal Compression", DDJ, pp.34–40, January 1996. In that paper the method was applied not to the motion estimation, but to the problem of fast still-image fractal compression. A set of gross characteristics was calculated for every pixel block in the image. The results of this gross characteristic calculation are then sorted in the form of a tree structure. When looking for the best match for a particular block of pixels, the first K number of best similar blocks (using the selected set of gross characteristics) are extracted from the tree structure and compared with the current block. This method is based on the assumption that the best matching block must be among the first K blocks extracted from said tree structure. This assumption may or may not be true. In this regard, the organizing data for all blocks from the frame in a tree structure is not suitable for the task of ME in video sequences because it does not easily allow the restriction of a search by a maximum of motion vector component values. It also does not provide means for selecting blocks with shorter motion vectors. Finally, sorting all of the data into said tree structure may itself take significant computation time.

As discussed above, the known fast methods and algorithms for motion estimation are generally based on one or more assumptions about expected continuity in the image frames of input video data: either the continuity in dependency of matching criterion from MV or some temporal or spatial correlation between the best possible MV values. Even in simple cases, when such assumptions are true for most of a given image area, there is some percentage of pixel areas in every frame in which those assumptions are not valid. For this reason, methods of fast ME that are based on these types of assumptions will fail to find good matching block for macroblocks in these areas. This results in dramatically reduced image quality in such image areas or will require higher data rates for transmitting said image areas with acceptable quality.

SUMMARY OF THE INVENTION

One object of the present invention is to provide a new method of motion estimation for motion video encoding that is not based on any of the picture continuity assumptions utilized in prior art methods, and is potentially capable of providing resulting motion vectors very close to the results which would be provided by a full-spiral search process.

Another object of the invention is to provide an apparatus based on the proposed method that may be implemented as a single VLSI chip for motion estimation in a video coding system.

Other objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for motion estimation for a set of pixel blocks (macroblocks) in a current video frame in reference to a previous video frame. In accordance with one aspect of the invention, the method includes calculating a set of characteristic values for each macroblock position in the previous video frame. Preferably, the method stores these values in memory in a fashion whereby they may be easily retrieved at a later time. For example, the values may be indexably stored in a table format. The method further calculates N levels of group characteristic values for a plurality of groups, wherein each group includes multiple macroblocks. The method then estimates motion for each reference macroblock from the current video frame, by testing highest level group characteristic values calculated in the step that calculates the N levels of group characteristics. Then, the method tests the next group characteristic values, if it has not already tested the lowest group. The method will continue until it ultimately tests the individual macroblock characteristics at the lowest group characteristic level.

In one embodiment, the method includes the steps of: calculating a set of characteristic values for each possible macroblock position on the "previous" video frame and storing said characteristic values in a memory in the form of a first level characteristic table; calculating N levels of group characteristic values for a plurality of groups comprising multiple macroblocks in each group and storing said group characteristic values in memory in the form of N group characteristic tables, where N could be greater than or equal to 0; carrying out the motion estimation for each required ("reference") macroblock from the "current" video frame by testing highest level group characteristic values, stored in the group characteristic table during the step (b), then proceeding to the testing of the next group characteristic values, or then testing all group characteristics from the lower group level, or then testing individual macroblock characteristics if it is already at the lowest group characteristic level, based on the result of said testing. If all preceding group characteristic testing and individual macroblock characteristic testing show the possibility that the tested macroblock is similar to the "reference" macroblock, then the actual calculation of macroblock matching criteria is to be done for the pair consisting of the tested macroblock and the "reference" macroblock. If the result of the calculation of said macroblock-matching criteria is better than that achieved before for the same "reference" macroblock, the new value of the matching criteria and new components of the motion vector are to be stored.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
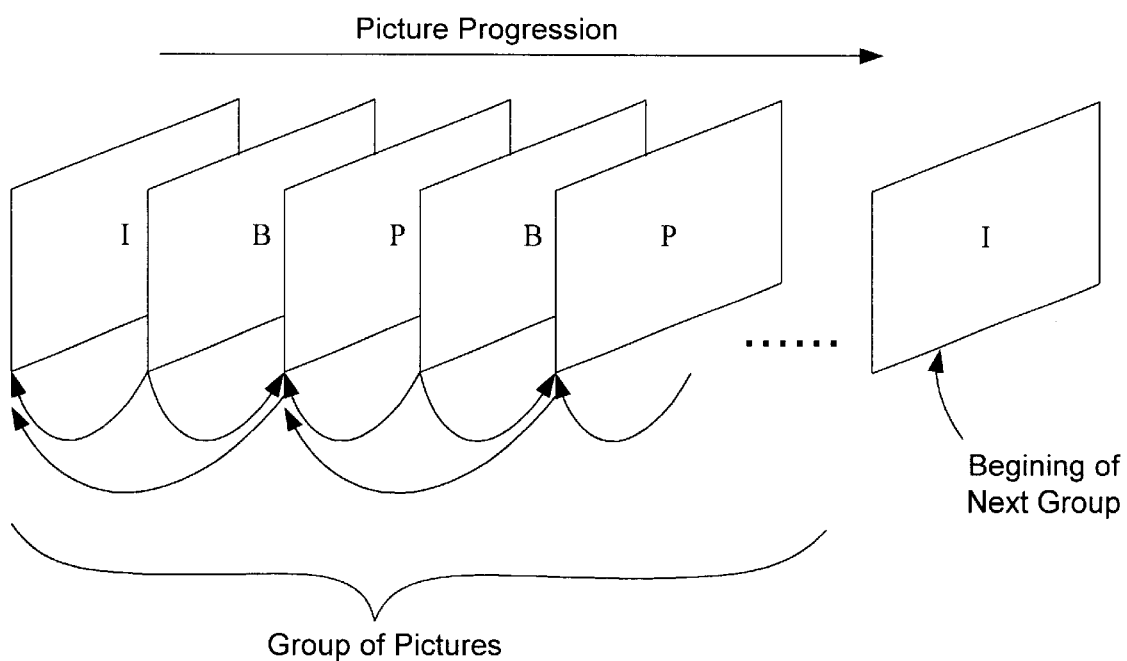
FIG. 1 is a block diagram illustrating the various frame types in a group of video frames.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It should be appreciated that the invention is not limited to the task of motion estimation in video encoding and can also be applied to the task of block matching or image area correlation for image recognition, robotic vision, still-image data compression, and other applications that may require searching for the best matching block of pixels or data values on a 2-dimensional image or data field.

By way of definition, the term "new frame" refers to the frame where new macroblocks are located and the term "previous frame" refers to the frame where the ME search procedure is performed to find the best similar macroblock. An "I Picture" (intraframe) is a frame that is encoded without reference to another picture, to allow for random access (See FIG. 1). A "P Picture" (Predictive) is encoded using motion compensated prediction on the previous picture. It therefore includes reference to the previous picture. P pictures, themselves, may be used in subsequent predictions. Finally, "B Pictures" (Bi-directional) are encoded using motion compensated prediction on both the previous and the next pictures, which must be either a B or P picture. B pictures are not used in subsequent predictions. In this regard, the preferred embodiment follows the terms and definitions used in the MPEG encoding standard specification.

With further reference to FIG. 1, a grouping of I, B, and P pictures, generally designated by reference numeral 10, is shown. More particularly, a specified sequence of pictures is known as a group of pictures (GOP). As illustrated, a GOP begins with an I picture to allow for random access to the group. A GOP can be made of different lengths to suit the type of video being encoded. For example, it is better to use a shorter group length for a film that contains a log of fast moving action with complex scenes, but longer GOPs can be used for sequences of lower complexity and less movement. A typical GOP size is 8–24 pictures.

Motions estimation is a method of determining the distance and direction of movement of picture blocks between two pictures. This may be achieved by dividing the picture to be encoded into sections known as macroblocks, such as 16×16 pixels. Each macroblock is searched for the closest match in the search area of the picture it is being compared with. The motion estimation is not used on I pictures, only B and P pictures, which can refer to I pictures.

Figure 2:
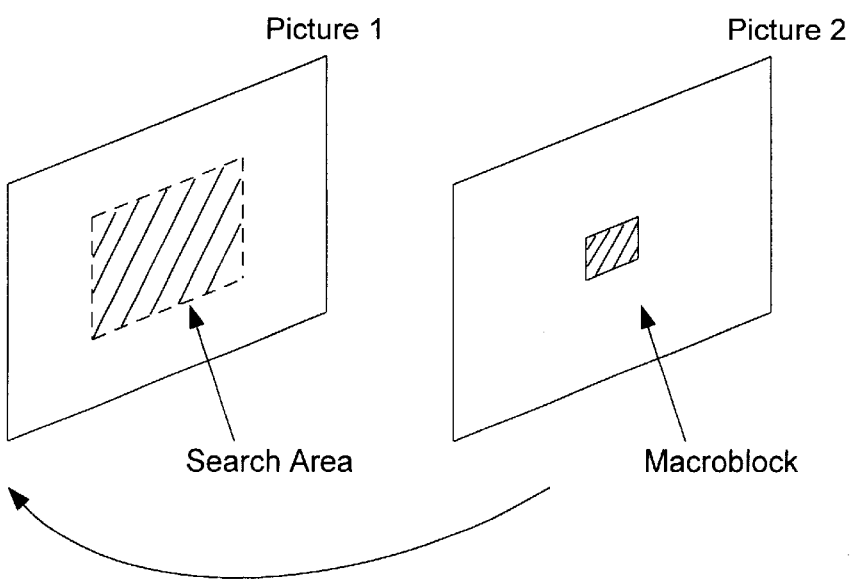
FIG. 2 is a diagram illustrating the search area reference to a given macroblock.

A search area is used in the motion estimation process to determine the area that the encoder searches in the previous picture for each macroblock (See FIG. 2). When the comparison is made, it can be on a pixel or half-pixel basis. Although a half-pixel search is more accurate and produces higher quality pictures, it is more processor intensive and thus more time consuming. As previously discussed, there are a number or ways of defining how macroblocks may be compared in the search area. One widely recognized method is a full block motion estimation search. In such a search, macroblocks are compared in the entire search area to seek a matching macroblock. This method, however, demands an intensive computational effort. Another method is a telescopic motion estimation search. In such a search, the motion vector of the macroblock in the current picture is expanded to be close to the motion vector of the same macroblock on the previous picture. The search area is relatively small around the macroblock that would be selected if the motion vector from the previous frame is selected. A third well known method performs a hierarchical motion estimation search. In such a search, before the search is made, the two pictures to be compared are scaled down in sizes by a factor of two or four to reduce the search area.

Different video compression methods and standards may utilize different frame encoding sequences. The "new frame" and the "previous frame" do not have to be in sequential order in the real motion video sequence. For example, in the case of MPEG compression, P frames may use motion compensation from a preceding P or I frame that is separated from the current frame by several B frames. B frames may use motion compensation from the two nearest P or I frames. So, when performing ME in MPEG video compression, the "previous frame" is a P or I frame that may have a larger actual number in the video sequence than the actual number of the B frame ("new frame"). For some methods of still image video compression the "new frame" and "previous frame" may even refer to different representations of the same picture. For the tasks of robotic vision and character recognition, the macroblocks of the "new frame" may refer not to the real video frames at all but to the table of objects that the system should recognize. The real frame numbers of "new frame" and "previous frame" are not significant for the following discussion.

In most video compression methods a motion estimation procedure is required for either all non-overlapping macroblocks on a new frame or a subset of such macroblocks. For example some macroblocks may not be changed from frame to frame and for that reason may not require any motion estimation. The particular set of macroblocks on the new frame that require motion estimation is not significant for the subject of the present invention.

For the sake of simplicity, the following description assumes that the system looks for the most similar rectangular or square pixel block (macroblock) on the previous video frame for all non-overlapping macroblocks on the current video frame. In one embodiment, all macroblocks are the same size, but other embodiments may use macroblocks of several different sizes. These differences in encoding methods are not significant with regard to a description of the principles of the present invention. The choice of a particular block-matching criterion is also not significant. It could be mean square error (MSE) or mean absolute distortion (MAD) or any other useful criterion that represents similarity between a pair of macroblocks from the new and previous frames.

A picture rectangle from any possible position in the previous video frame may be accepted as the best matching block for some macroblock in the new frame. Some video encoding methods and standards, for example MPEG-1 and MPEG-2, may allow, for motion compensation purposes, the use of macroblocks located in non-integer pixel positions (half pels, in the MPEG standards' terminology). Although the following description refers to a search on integer pixel coordinates of macroblocks, the method can be easily extended to the case of half pel search accuracy.

In the following discussion, a "possible macroblock" refers to any macroblock from the previous frame that can potentially be used for motion compensation of some macroblock in the new frame. The macroblock position is defined (herein) as the pair of horizontal and vertical coordinates denoting the top left comer of the particular macroblock on the video frame. A Motion Vector (MV) is essentially a vector with components equal to differences in the positions of a pair of macroblocks.

Any macroblock can be assigned a set of characteristic values, wherein the characteristic values are chosen so that they represent the general properties of the pixel values on the macroblock. A large variety of characteristics may be used, provided they are not correlated with each other and should have approximately the same values for a pair of similar macroblocks. For example, the average of pixel values, Fourier coefficients, image intensity gradients and many other characteristics may be used.

The proposed ME method includes the steps of (1) creating a macroblock characteristic table, also referred to as a first level table; (2) creating a group characteristic table, also referred to as a second level table; and (3) implementing the motion estimation process for the required set of macroblocks from the new frame. Each of these steps is discussed below.

Creating A Macroblock Characteristic Table (the First Level Table)

The characteristics for all possible positions of macroblock on the previous video frame are calculated. The values of all characteristics for all possible positions are stored in a Macroblock Characteristic Table (first level table) in memory. For example, in the case of MPEG video encoding of motion video with frame sizes M×N, and the size of the macroblock is 16×16 pixels, the total number of possible macroblock positions on the frame will be equal to $(M-15) \times (N-15)$ (since the MPEG standard does not allow motion compensation with macroblock that is not entirely located inside the image). If, for example, three different characteristic values per macroblock are used, then the total number of values calculated and stored in the characteristic table will be equal to $3 \times (M-15) \times (N-15)$.

Creating a Group Characteristic Table (the second level table)

The whole set of possible macroblock positions is divided into some set of groups. It may be a grid of non-overlapping rectangular areas of fixed size, for example, 4×4 pixels. All macroblocks with positions that are inside a particular rectangular area are associated into a particular group. The macroblocks associated with the particular group may be mutually overlapped. For every macroblock group a set of group characteristics is calculated. For example, it may be maximum and minimum values of each of the individual macroblock characteristics. In that case, if each macroblock has three different characteristic values, then its macroblock group has six group characteristics, representing maximum and minimum value of all individual macroblock characteristics. The group characteristics are calculated for all macroblock groups and stored in memory in the Group Characteristic Table (second level table).

For example, in the case of MPEG video encoding of motion video with frame sizes M×N and a macroblock size of 16×16 pixels, if macroblocks are grouped on a grid of non-overlapping pixel squares with size 4×4 pixels, the number of possible macroblocks in the group equals 16. The total number of groups will be $N_{groups}=((M-15)/4) \times ((N-15)/4)$. If six characteristic values per group are used, then the number of integer characteristic values in the second level characteristic table will equal $6 \times N_{groups}$.

Consistent with the concepts and teachings of the present invention, it is possible to extend the method by creating a third level of tables comprising group characteristics for the groups of the second level groups and so on. The optimum amount of levels of tables depends on the particular application. In most practical implementations use of two or three levels of tables is likely to provide best performance. In the preferred embodiment of the present invention for the motion estimation in MPEG video compression, first and second level tables are used, where macroblock groups for the second level tables are rectangles 4×4 pixels in size.

The Implementation of Motion Estimation Process for the Required Set of Macroblocks from the New Frame As described above, the motion estimation process starts with the calculation of a set of characteristics for the particular (reference) macroblock from the new frame. Exactly the same set of characteristics as in the first step should be used (the first step calculated characteristic values for all possible macroblock positions on the previous frame). An attempt is made to minimize the block-matching criterion during the process of ME, until the best matching macroblock is found.

The ME procedure itself consists of sequentially testing all highest level macroblock groups (created in the second step) that are located within a certain distance of the location of the reference macroblock, or, possibly, all highest level macroblock groups on the previous frame, depending on the particular application requirements.

The preferred order of highest level macroblock group testing in MPEG video compression is a spiral order starting with the macroblock groups closest to the reference macroblock. This testing order ensures results that are closest to the results of a full spiral search, which is generally assumed to provide best possible results of ME. Other testing sequences that cover all macroblock locations on the previous frame may be used as well.

The testing of macroblock groups comprises the procedure of comparing the set of characteristics of the reference macroblock with the set of group characteristic of the particular group, and making a logical decision based on that comparison, if at least one of the individual macroblocks from this group is found to be similar to the reference macroblock.

It will be appreciated that it is not necessary to calculate the group characteristics or individual characteristics of a particular group or macroblock from the previous frame, because these values were calculated in the first and second steps, and stored in the characteristic tables. For example, in the preferred embodiment this decision is made when all characteristics values of the reference macroblock are within some fixed intervals depending on values of the group characteristics for the particular macroblock group. In this regard, it will be appreciated that intervals of different group characteristics may be different. If the decision for the particular group is made, then the testing procedure is applied. If several levels of macroblock groups are used, then the same testing procedure should be applied to all groups that are associated with the current group in the lower level of group tables. If, however, it was the lowest level of group tables or if only one group table level is used, then the testing procedure is applied to all individual macroblocks associated in the current macroblock group.

The testing procedure for the individual macroblock compares a set of characteristics of the reference macroblock with a set of characteristics of the current macroblock and makes a logical decision based on that comparison, this macroblock is similar to the reference macroblock.

For example, in the preferred embodiment, this decision is made when all characteristic values of the reference macroblock are within the interval for the same characteristic for the particular macroblock plus or minus a fixed threshold value. Specifically, the preferred embodiment tests whether the following is true:

$$B-\Delta \leq C \leq B+\Delta,$$

where:
C=tested macroblock characteristics;
B=characteristic of reference macroblock; and
$\Delta$=some predetermined value.

If the decision is made for the particular macroblock, the block-matching criterion is calculated (for example MSE or MAD) for the pair comprising the reference macroblock and the particular macroblock from the previous frame. If the resulting value of the block-matching criterion is less (i.e., "better") than achieved before, this new value of block matching criterion and new motion vector component values is stored.

Thus, the preferred decision is based on conventional block matching criteria, as in full spiral search. All of the preceding decisions, described above, are designed to avoid the lengthy process of calculating block-matching criteria for macroblocks that are not similar to the currently processed reference macroblock. Accordingly, all preceding steps deal with a process of elimination that removes dissimilar macroblocks from the scope of the block-matching procedure, with the high probability of a correct decision, based on the macroblock characteristics.

In this regard, the logic of the decisions for all levels of group tables, as suggested in the preceding example, ensures that if at least one individual macroblock from the lowest group satisfies the logic of the decision as described above, then it will test at lower group levels, and will eventually test individual macroblocks in the lowest group. This means, in other words, that group level decisions will not lead to the loss of any individual macroblock that might be accepted by individual testing from the full scope of the search. Therefore, the use of group tables does not affect the quality of the result of the ME search compared to direct testing of individual macroblock characteristics only.

The group tables are created in order to make the ME process faster. They do this by allowing the process to avoid testing individual characteristics of all macroblocks in a group, when, in most cases, the particular group does not contain any suitable individual macroblock. For example, in the preferred embodiment of the present invention, for MPEG video compression, using second level group tables provides an increase in the speed of the ME process by a factor of approximately 10, without any loss in quality, compared to using individual macroblock characteristics only.

The second step (that of creating a second level characteristic table) is optional and may be possibly omitted in some simple embodiments of the present invention.

It may appear at first that the first and second steps—the calculation individual and group characteristic tables for all macroblock positions on the previous frame—will take a significant amount of time. However, there is a way to avoid this problem. If all macroblock characteristics are linear functions of pixel values in the macroblock, such as average pixel values and gradients, a recursive calculation procedure may be applied. Another consideration is that the individual and group characteristic tables should be calculated only for those video frames that will be used as "previous frames" in the compression sequence.

For example, when implementing for MPEG video compression, the group characteristic tables should be calculated only for P and I frames and do not need to be calculated for B frames. Since there are usually several B frames between each P or I frame, significant calculation reduction is achieved. In the preferred embodiment of the present invention for MPEG video compression, the process of calculating individual and group characteristic tables usually takes less than 5% of the total ME calculation time.

The ME method of the present invention has been implemented for MPEG video encoding in a computer program, and testing results show outstanding capabilities of the suggested method. It has proven to reduce time required for motion estimation by an order of 100, compared to a full spiral search, while providing almost the same level of data compression and image quality. It provides stable encoding results for motion video, with high levels of noise and arbitrary numbers and sizes of visible moving objects. Accordingly, it provides very fast, high-quality MPEG video encoding.

Figure 3:
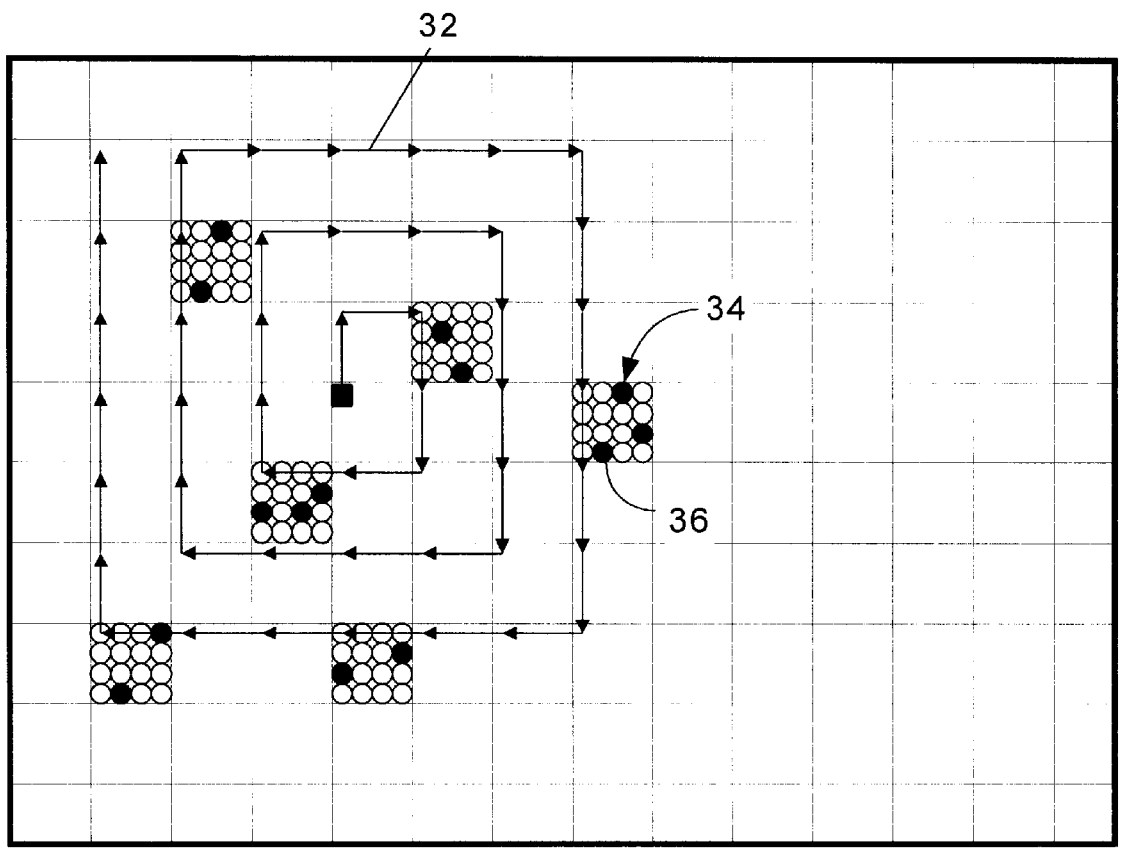
FIG. 3 is a representation of a spiral ME search pattern using two levels of characteristic tables, where the second level table comprises group characteristics for groups with sizes 4×4 pixels.

To illustrate the operation of the invention, an example of the ME search pattern for 2 levels of characteristic tables is represented in FIG. 3. The thin, spiraling arrow 32 shows the sequence of testing second level group characteristics. The second level table comprises group characteristics for groups with a size of 4×4 pixels. If the testing of group characteristics shows the possibility of at least one macroblock in the group to be similar with the reference macroblock, then testing is performed for all macroblocks in that group. The positions of the tested macroblocks are represented by small circles 34 inside the 4×4 group areas. If the testing of individual macroblock characteristics shows the possibility that the current macroblock may be similar to the reference macroblock, the actual computation of block matching criterion is done. The positions of macroblocks for which the computation of block-matching criteria is required are represented by black filled circles 36. In the preferred embodiment, only a small fraction of the full set of macroblock locations within a given search area are subjected to block matching computations (represented by black filled circles). One of these locations corresponds to the best matching macroblock to be found. Accordingly, fewer computations are required.

The amount of computation required to obtain a value for block-matching criterion is about 768 integer arithmetic operations, which are done only in the locations represented by black filled circles. In comparison, the number of arithmetic operations required for the testing of characteristic values is about 6 integer subtractions and 3 logical AND operations per macroblock (in the case of 3 characteristic values), that is done in all locations represented by both the filled and empty small circles. The total number of calculations is reduced even more due to the preliminary testing of group characteristics, which happens only once per group (represented by locations where the arrows point, i.e. only once for all 16 macroblock locations in the 4×4 group). In the case of a traditional full-spiral search ME, all macroblock locations within the search area would require the completion of full block-matching computations.

Figure 4:
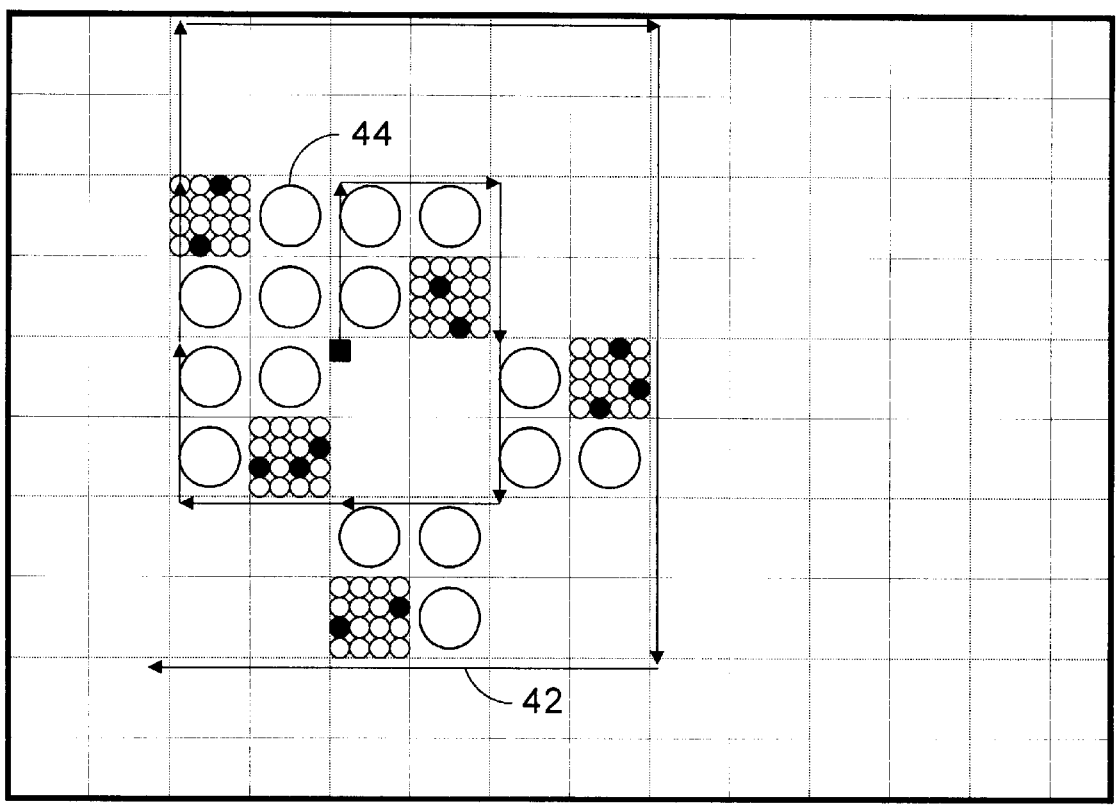
FIG. 4 is a representation of a spiral ME search pattern using three levels of characteristic tables, where the third level table comprises group characteristics for high-level groups with sizes 8×8 pixels, and second level table comprises group characteristics for low-level groups with sizes 4×4 pixels.

To reduce the number of computations even more, a third level of group tables may be applied. An example of ME search pattern using three levels of characteristic tables is represented in FIG. 4. The thin, spiraling arrow 42 shows the sequence of testing third level group characteristics. The third level table comprises group characteristics for groups of 8×8 pixels. If the testing of higher-level group characteristics shows possibility of at least one macroblock in the higher-level group to be similar to the reference macroblock, then the testing process is performed for all second level groups in the third level group.

The second level table comprises group characteristics for groups of 4×4 pixels. The positions of the tested second level groups are represented by both large and small circles. Large circles 44 show locations of second level groups (groups of 4×4 pixels) where characteristics were tested and did not show the possibility of the presence of at least one similar macroblock. If testing second level group characteristics shows the possibility that at least one macroblock in the group is similar to the reference macroblock, then the testing process is performed for all individual macroblocks in that group.

The positions of the tested macroblocks are represented by small circles inside the 4×4 group areas. If the testing of individual macroblock characteristics shows the possibility that the current macroblock may be similar to the reference macroblock, the actual computation of block-matching criterion is performed. The positions of macroblocks where the computation of block-matching criterion is required are represented by black filled circles.

In this case, the number of computations is further reduced compared to the case shown in FIG.3, due to the preliminary selection of groups using third level characteristic tables.

In accordance with one aspect of the present invention, an apparatus is provided for motion estimation, based on the ME method described above. The apparatus may be implemented as a VLSI chip for ME that can be used as a component of digital video encoding devices designed, for example, for digital satellite TV transmitter, video conferencing system, or DVD mastering application. The apparatus may also be implemented as an internal part of a larger VLSI chip for digital video encoding.

Figure 5:
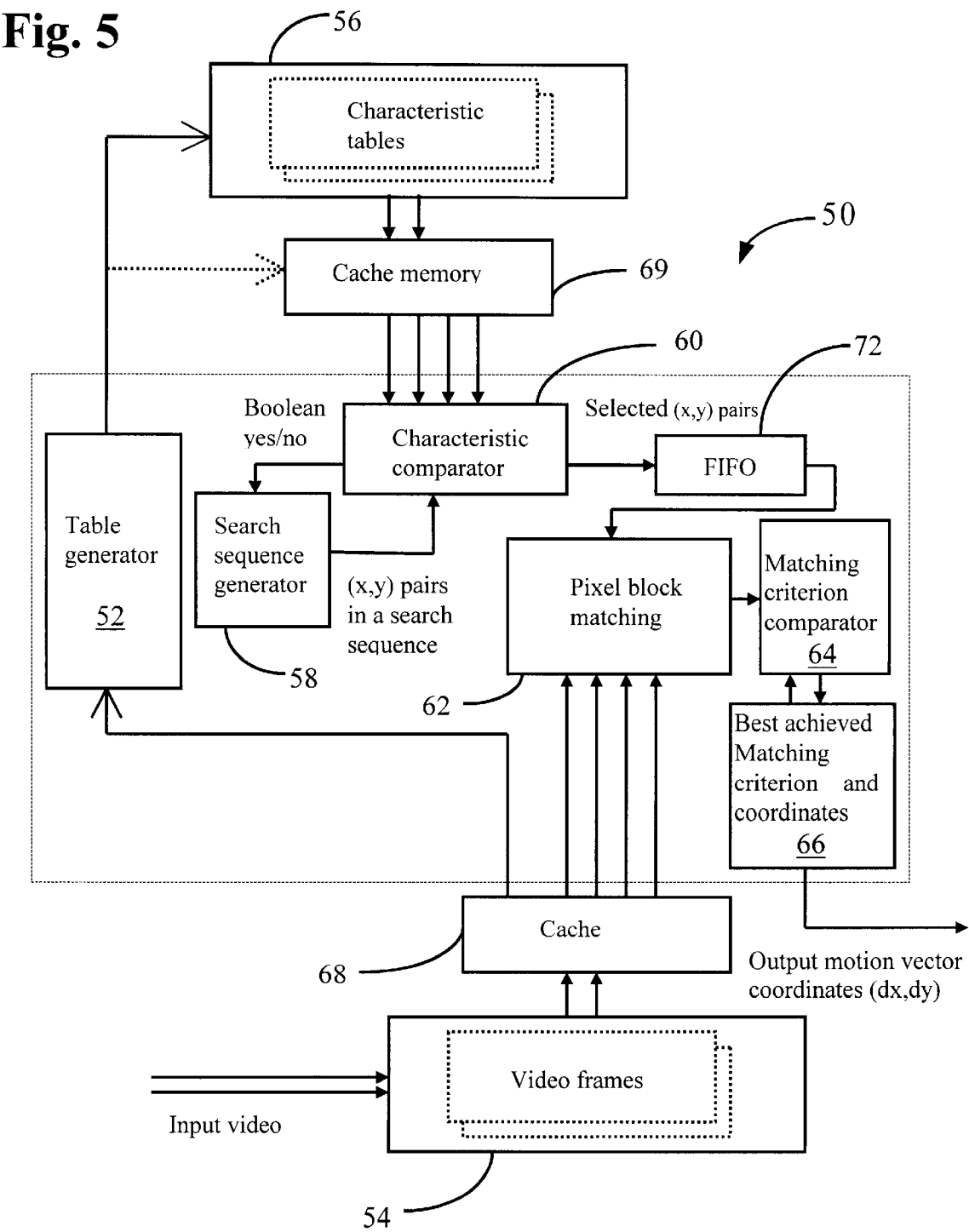
FIG. 5 represents a structure of an apparatus for motion estimation based on suggested in the present invention ME method.

In this regard, reference is made to FIG. 5, which shows a block diagram of an apparatus constructed in accordance with the invention. The apparatus 50 includes a table generator 52 that uses video frame data stored in a video frame memory unit 54 to calculate characteristic tables to be stored in a characteristic table memory unit 56. A search sequence generator 58 generates pairs of group or macroblock coordinates in the search sequence that may be required by the particular application, for example, a spiral search sequence. A group and/or individual macroblock characteristic comparator 60 tests a set of group or individual macroblock characteristics and generates a logical signal, accepting or rejecting the particular group or individual macroblock. The comparator 60 uses tables created by the table generator 52 and stored in the characteristic table memory unit 56. The logical signal generated by the comparator 60 controls the behavior of search sequence generator 58 that may proceed to the next group or macroblock, or proceed to the lower group table level for testing. The logical signal generated by the comparator 60 also controls a block matching unit 62 that is capable of getting pixel values of the whole macroblock from the video frame memory unit 54 and comparing them with the currently processed reference macroblock pixels to calculate the target block matching criterion to be minimized.

A matching criterion comparator unit 64 compares the currently calculated matching criterion with the best previously achieved, and if the current matching criterion is better, then replaces the stored value of the best achieved matching criterion and corresponding motion vector components stored in a memory unit 66 with the new values. Optional cache memory units 68 and 69 are especially necessary if the video frame memory unit 54 and/or the characteristic table memory unit 56 are located outside of the main VLSI chip, in order to reduce the average time of memory access. An optional coordinate FIFO unit 72 stores (x,y) pairs of macroblock coordinates generated by the characteristic comparator 60. It allows the search sequence generator 58 and the characteristic comparator 60 to continue to work independently of the block matching unit 62 until the data capacity of the FIFO unit 72 is full.

The block matching unit 62 has the most calculation intensive task because each block match requires approximately 768 integer arithmetic operations (for macroblock sizes of 16×16). Said block matching unit 62 should be implemented as a parallel and/or pipelined device with multiple arithmetic units to improve performance. Even in this case, the system performance is somewhat limited by the memory access time required to obtain all pixel values for a macroblock. The purpose of the ME algorithm described in the present invention is to reduce the computational load of the block matching unit 62 by rejecting the potentially unsuitable macroblocks during the preceding steps of group and individual characteristic comparison.

The entire structure of said apparatus is designed to allow a maximum level of parallel operations. The table generator 52 can generate new group and individual characteristic tables for the next video frame while all other units are working on ME for the previous and next video frames using tables generated before for the previous frame. Independently, the search sequence generator 58 and the characteristic comparator 60 are working using data only from the characteristic table memory unit 56 to generate a sequence of (x,y) pairs of macroblock coordinates stored in the coordinate FIFO unit 72 and to be processed by the block-matching unit 62. A synchronously from this, the block matching unit 62 takes sequential (x,y) coordinate pairs from the coordinate FIFO unit 72 and compares the reference macroblock and macroblocks at (x,y) positions using data from the video frame memory unit 54.

When block matching is completed the matching criterion comparator unit 64 may start to compare the recently calculated matching criterion with the best achieved before. Simultaneously the block matching unit 62 starts calculation for the next macroblock pair. Two separate memory and cache units are suggested to allow independent and simultaneous access to the video frame and characteristic tables data by different units. To achieve higher performance said apparatus may contain not one, but multiples of any of the described computational units. Almost all units within the apparatus may consist of several basic units working in parallel.

In order to provide minimum delay and best possible performance, while accessing data from memory both cache memory units 68 and 69 should have sufficient capacity to keep the data for the entire ME searching area. If this condition is satisfied, then most of the data for calculations will be received from the cache memory units. The data in cache memory will be partially replaced by new data when the search area is moving continuously within a frame, when processing the next reference macroblock.

By way of example, in the case of MPEG video encoding, with macroblock sizes 16×16 and a search area of +/−32 pixels, the cash memory units 68 and 69 should have a minimum size of approximately 4096 bytes each. The size of the video memory cache unit may be reduced because not all macroblocks within the search area take part in calculations due to the nature of the suggested ME method. On the other hand, the characteristic table memory 56 possibly requires a larger memory cache size depending on the number of bytes per characteristic value and the number of characteristic values per macroblock.

The units of said apparatus may be implemented as separate non-programmable state machines, or some of them may be functionally replaced by general programmable processor units. The operations that should take a relatively small fraction of the total computation time, such as search sequence generation and comparison logic, may be best implemented in a programmable processor unit. The characteristic table generation and the block matching calculations require special pipeline computation units for best performance.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for motion estimation for a set of pixel blocks (macroblocks) in a current video frame comparatively to a reference video frame comprising the steps of:

(a) calculating of a set of characteristic values for every coordinate pair (x,y) of a permissible reference macroblock position in the reference frame and storing the calculated values in a memory;

(b) calculating N levels of group characteristic values for a plurality of groups comprising multiple admissible reference macroblocks in each group and storing said calculated group characteristic values in a memory;

(c) calculating equivalent characteristic values for a current macroblock from the current frame;

(d) starting the process of selecting potentially suitable positions of reference macroblocks on the reference frame by testing a highest level group characteristic values in a permissible motion search region against the characteristic values of said current macroblock;

(e) if the testing in step (d) provides a positive result, then repeat testing a next (lower) level, group characteristic value within a selected higher level group region against the characteristic values of said current macroblock, if not at the lowest level of group of said characteristic values;

(f) if the testing in step (e) provides a positive result, then, at a lowest level of said characteristic values, repeat testing characteristic values of the reference macroblock against the characteristic values of said current macroblock within the lowest level group region; and (g) if the testing in step (f) provides a positive result, then, calculating the macroblock matching criteria for a pair including the current macroblock and the reference macroblock if an evaluation of all preceding group characteristic testing and individual macroblock characteristic testing shows that the current macroblock is similar to the reference macroblock.

2. The method for motion estimation as defined in claim 1, wherein step (a) includes a calculation of a set of characteristic values for a subset of the admissible coordinates.

3. The method for motion estimation as defined in claim 1, wherein the calculation of the characteristic values is performed separately for even and odd lines of pixels on the reference video frame to carry out the motion estimation for interlaced video format.

4. The method for motion estimation as defined in claim 1, wherein calculation of the characteristic values for the reference frame at steps (a) and (b) is implemented for a sequence of all permissible macroblock positions be repeating recurrent computations using previously calculated values in preceding rows and columns to reduce the amount of computations.

5. The method for motion estimation as defined in claim 1, further including the step of storing the new value of the matching criteria and new components of the motion vector, if the result of the calculation of said macroblock-matching criteria is better than that achieved before for the same reference macroblock.

6. The method for motion estimation as defined in claim 1, wherein the testing of highest level group characteristic values is to proceed sequentially in a spiral order starting with the highest level macroblock group nearest to the reference macroblock.

7. The method for motion estimation as defined in claim 1, wherein the macroblock characteristic values are average pixel values and approximated values of horizontal and vertical gradients of pixel values.

8. The method for motion estimation as defined in claim 1, wherein the macroblock group includes all macroblocks having a top left corner with a defined rectangular area with the video frame.

9. The method for motion estimation as defined in claim 1, wherein the N levels of macroblock groups are created by combining on each higher level several groups from the nearest lower group level.

10. The method for motion estimation as defined in claim 1, wherein the group characteristics comprise maximum and minimum values of each of the individual macroblock characteristics within all macroblocks from the group.

11. The method for motion estimation as defined in claim 1, wherein the group characteristics comprise all macroblocks from all lower level groups within the group.

12. The method for motion estimation as defined in claim 1, wherein the group characteristic testing comprises checking if all reference macroblock characteristics values are within some intervals calculated based on the values of the group characteristic.

13. The method for motion estimation as defined in claim 12, wherein the intervals of characteristic values are defined as intervals between the group characteristic containing the minimum of individual characteristic values minus a first predetermined threshold value, and the group characteristic containing the maximum of individual characteristic values plus a second predetermined threshold value.

14. The method for motion estimation as defined in claim 13, wherein the first predetermined threshold value and the second predetermined threshold value are the same.

15. The method for motion estimation as defined in claim 1, wherein the individual macroblock characteristic testing includes the step of checking if all reference macroblock characteristic values are within some intervals calculated based on the values of the individual characteristic for a currently tested macroblock.

16. The method for motion estimation as defined in claim 15, wherein the intervals of individual macroblock characteristic values are defined as intervals between the appropriate macroblock characteristic value minus a first predetermined threshold value and the same macroblock characteristic value plus the second predetermined threshold value.

17. The method for motion estimation as defined in claim 1, further including the step of storing the characteristic values in a memory, in the form of a first level characteristic table.

18. The method for motion estimation as defined in claim 1, further including the step of storing the group characteristic values in a memory in the form N group characteristic tables, wherein the case of N=0 corresponds to an implementation where the group characteristic values are not used and only the testing of individual macroblock characteristic values is performed.

19. An apparatus for motion estimation for a set of pixel blocks (macroblocks) on a current video frame in reference to a previous video frame comprising:

first computing means for computing a set of characteristic values for each macroblock position on the previous video frame;

second computing means for computing N levels of group characteristic values for a plurality of multiple macroblock groups; and motion estimation means for carrying out motion estimation for each reference macroblock from the current video frame by testing highest level group characteristics, then proceeding to test the next highest group characteristic values, and ultimately testing individual macroblock characteristic values at the lowest group characteristic level.

20. The apparatus as defined in claim 19, further including first memory means for storing the characteristic values in the form of a first level characteristic table.

21. The apparatus as defined in claim 20, wherein the form of the first level characteristic table may be implemented by using pointers, indexes, and other means for controllably storing and retrieving data.

22. The apparatus as defined in claim 19, further including second memory means for storing the group characteristic values in the form of N group characteristic tables, wherein N is an integer value greater than 0.

23. The apparatus as defined in claim 19, wherein the motion estimation means is operative to calculate macroblock matching criteria for a pair including a tested macroblock and a reference macroblock, only if all preceding characteristic testing indicates a probability that the tested macroblock is similar to the reference macroblock.

24. The apparatus as defined in claim 23, further including means for storing the macroblock matching criteria, the means for storing operative to store the new value of the matching criteria if the new value of the matching criteria is better than the previously stored value.

25. An apparatus for motion estimation for a set of pixel blocks (macroblocks) on a current video frame in reference to a previous video frame comprising:

memory means for storing a plurality of video frames, including the current video frame and the previous video frame;

a table generator in communication with the memory means for generating a table of characteristic values for each macroblock position on the previous video frame, and for generating N levels of group characteristic values for a plurality of multiple macroblock groups;

characteristic comparator responsive to the generated characteristic values for testing group and individual characteristic values and making logical decisions affecting the sequence of search, a block-matching unit responsive to the characteristic comparator for computing block-matching criteria, and a matching criterion comparator for testing whether a current calculated block-matching criterion is better than any previously calculated block matching criterion, the matching criterion comparator including memory space for storing the best calculated block matching criterion, whereby the contents of the memory space are indicative of an output motion vector coordinate.

26. The apparatus as defined in claim 25, wherein the various elements are configured to operate independently and a synchronously to improve performance.

27. The apparatus as defined in claim 25, wherein at least one of the various elements are implemented by a general purpose programmable processing unit.

* * * * *